(12) United States Patent
Qiu et al.

(10) Patent No.: US 9,403,153 B2
(45) Date of Patent: Aug. 2, 2016

(54) HIGHLY STABLE HYDROCARBON-SOLUBLE MOLYBDENUM CATALYST PRECURSORS AND METHODS FOR MAKING SAME

(71) Applicant: Headwaters Technology Innovation, LLC, Lawrenceville, NJ (US)

(72) Inventors: He Qiu, Trenton, NJ (US); Bing Zhou, Cranbury, NJ (US)

(73) Assignee: HEADWATERS HEAVY OIL, LLC, Salt Lake City, UT (US)

( * ) Notice: Subject to any disclaimer, the term of this patent is extended or adjusted under 35 U.S.C. 154(b) by 177 days.

(21) Appl. No.: 13/787,377

(22) Filed: Mar. 6, 2013

(65) Prior Publication Data

US 2013/0248422 A1    Sep. 26, 2013

Related U.S. Application Data

(60) Provisional application No. 61/615,503, filed on Mar. 26, 2012.

(51) Int. Cl.

| | | |
|---|---|---|
| *B01J 27/051* | (2006.01) | |
| *B01J 31/04* | (2006.01) | |
| *B01J 23/28* | (2006.01) | |
| *C10G 47/06* | (2006.01) | |
| *C10G 47/26* | (2006.01) | |
| *B01J 31/22* | (2006.01) | |
| *B01J 31/00* | (2006.01) | |
| *C10G 49/00* | (2006.01) | |
| *C10G 47/04* | (2006.01) | |

(52) U.S. Cl.
CPC ............... *B01J 27/051* (2013.01); *B01J 23/28* (2013.01); *B01J 27/0515* (2013.01); *B01J 31/00* (2013.01); *B01J 31/04* (2013.01); *B01J 31/22* (2013.01); *B01J 31/2208* (2013.01); *B01J 31/2226* (2013.01); *C10G 47/04* (2013.01); *C10G 47/06* (2013.01); *C10G 47/26* (2013.01); *C10G 49/00* (2013.01); *C10G 2300/107* (2013.01); *C10G 2300/1077* (2013.01); *C10G 2300/4037* (2013.01)

(58) Field of Classification Search
CPC ...... B01J 27/051; B01J 27/0515; B01J 31/04; B01J 31/22; B01J 31/2208; B01J 31/2226; B01J 23/28

See application file for complete search history.

(56) References Cited

U.S. PATENT DOCUMENTS

| | | | |
|---|---|---|---|
| 3,362,972 A | 1/1968 | Kollar | |
| 3,578,690 A | 5/1971 | Becker | |
| 3,595,891 A | 7/1971 | Cavitt | |
| 3,953,362 A | 4/1976 | Lines et al. | |
| 3,983,028 A | 9/1976 | McCollum et al. | |
| 4,022,681 A | 5/1977 | Sheng et al. | |
| 4,066,561 A | 1/1978 | Nnadi | |
| 4,125,455 A | 11/1978 | Herbstman | |
| 4,134,825 A | 1/1979 | Bearden, Jr. et al. | |
| 4,151,070 A | 4/1979 | Allan et al. | |
| 4,181,601 A | 1/1980 | Sze | |
| 4,191,636 A | 3/1980 | Fukui | |
| 4,192,735 A | 3/1980 | Aldridge et al. | |
| 4,305,808 A | 12/1981 | Bowes et al. | |
| 4,325,802 A | 4/1982 | Porter et al. | |
| 4,352,729 A | 10/1982 | Jacquin et al. | |
| 4,411,768 A | 10/1983 | Unger et al. | |
| 4,422,927 A | 12/1983 | Kowalczyk et al. | |
| 4,435,314 A | 3/1984 | van de Leemput et al. | |
| 4,454,023 A | 6/1984 | Lutz | |
| 4,465,630 A | 8/1984 | Akashi et al. | |
| 4,467,049 A | 8/1984 | Yoshii et al. | |
| 4,485,004 A | 11/1984 | Fisher et al. | |
| 4,581,344 A | 4/1986 | Ledoux et al. | |
| 4,585,545 A | 4/1986 | Yancey, Jr. et al. | |
| 4,590,172 A | 5/1986 | Isaacs | |
| 4,592,827 A | 6/1986 | Galiasso et al. | |
| 4,592,830 A | 6/1986 | Howell et al. | |

(Continued)

FOREIGN PATENT DOCUMENTS

| | | |
|---|---|---|
| CA | 2004882 | 6/1991 |
| CA | 2088402 | 7/1993 |

(Continued)

OTHER PUBLICATIONS

Molecular Profile Report, Cobalt Benzoate, http://chemfinder.cambridgesoft.com/chembiofinder/forms/search/contentarea/chembiovizsearch.aspx?formgroupid=8&appname=chembiofinder&allowfullsearch=true&keeprecordcountsynchronized-flase&searchcriteraid=47searchcriteravalue=932-69-4&currentindex=0.

(Continued)

*Primary Examiner* — Renee E Robinson
(74) *Attorney, Agent, or Firm* — Workman Nydegger

(57) ABSTRACT

Hydrocarbon-soluble molybdenum catalyst precursors include a plurality of molybdenum cations and a plurality of carboxylate anions having at least 8 carbon atoms. The carboxylate anions are alicyclic, aromatic, or branched, unsaturated and aliphatic, and can derived from carboxylic acids selected from 3-cyclopentylpropionic acid, cyclohexanebutyric acid, biphenyl-2-carboxylic acid, 4-heptylbenzoic acid, 5-phenylvaleric acid, geranic acid, 10-undecenoic acid, dodecanoic acid, and combinations thereof. The molybdenum salts have decomposition temperatures higher than 210° C. The catalyst precursors can form a hydroprocessing molybdenum sulfide catalyst in heavy oil feedstocks. Also disclosed are methods for making catalyst precursors and hydrocracking heavy oil using active catalysts.

23 Claims, 5 Drawing Sheets

(56) References Cited

U.S. PATENT DOCUMENTS

| | | |
|---|---|---|
| 4,606,809 A | 8/1986 | Garg |
| 4,633,001 A | 12/1986 | Cells |
| 4,652,311 A | 3/1987 | Gulla et al. |
| 4,652,647 A | 3/1987 | Schlosberg et al. |
| 4,693,991 A | 9/1987 | Bjornson et al. |
| 4,695,369 A | 9/1987 | Garg et al. |
| 4,707,245 A | 11/1987 | Baldasarri et al. |
| 4,707,246 A | 11/1987 | Gardner et al. |
| 4,713,167 A | 12/1987 | Reno et al. |
| 4,716,142 A | 12/1987 | Laine et al. |
| 4,734,186 A | 3/1988 | Parrott et al. |
| 4,762,607 A | 8/1988 | Aldridge et al. |
| 4,762,814 A | 8/1988 | Parrott et al. |
| 4,765,882 A | 8/1988 | Aldridge et al. |
| 4,770,764 A | 9/1988 | Ohtake et al. |
| 4,802,972 A | 2/1989 | Kukes et al. |
| 4,812,228 A | 3/1989 | Angevine et al. |
| 4,824,611 A | 4/1989 | Cells |
| 4,834,865 A | 5/1989 | Kukes et al. |
| 4,837,193 A | 6/1989 | Akizuki et al. |
| 4,863,887 A | 9/1989 | Ohtake et al. |
| 5,017,712 A | 5/1991 | Usui et al. |
| 5,114,900 A | 5/1992 | King |
| 5,171,916 A | 12/1992 | Le et al. |
| 5,254,240 A | 10/1993 | Galiasso et al. |
| 5,332,489 A | 7/1994 | Veluswamy |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,474,977 A | 12/1995 | Gatsis |
| 5,578,197 A | 11/1996 | Cyr et al. |
| 5,622,616 A | 4/1997 | Porter et al. |
| 5,866,501 A | 2/1999 | Pradhan et al. |
| 5,868,923 A | 2/1999 | Porter et al. |
| 5,871,638 A | 2/1999 | Pradhan et al. |
| 5,916,432 A | 6/1999 | McFarlane et al. |
| 5,935,419 A | 8/1999 | Khan et al. |
| 5,954,945 A | 9/1999 | Cayton et al. |
| 5,962,364 A | 10/1999 | Wilson, Jr. et al. |
| 6,059,957 A | 5/2000 | Khan et al. |
| 6,068,758 A | 5/2000 | Strausz |
| 6,093,824 A | 7/2000 | Reichle et al. |
| 6,136,179 A | 10/2000 | Sherwood et al. |
| 6,139,723 A | 10/2000 | Pelrine et al. |
| 6,214,195 B1 | 4/2001 | Yadav et al. |
| 6,274,530 B1 | 8/2001 | Cayton et al. |
| 6,379,532 B1 | 4/2002 | Hoehn et al. |
| 6,455,594 B1 | 9/2002 | Tsuji |
| 6,462,095 B1 | 10/2002 | Bonsel et al. |
| 6,596,155 B1 | 7/2003 | Gates et al. |
| 6,660,157 B2 | 12/2003 | Que et al. |
| 6,686,308 B2 | 2/2004 | Mao et al. |
| 6,712,955 B1 | 3/2004 | Hou et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,666,915 B2 | 2/2010 | Zhang et al. |
| 7,670,984 B2 | 3/2010 | Wu et al. |
| 7,842,635 B2 | 11/2010 | Zhou et al. |
| 7,951,745 B2 | 5/2011 | Zhou et al. |
| 8,097,149 B2 | 1/2012 | Wu et al. |
| 8,445,399 B2 | 5/2013 | Wu et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0147618 A1 | 7/2004 | Lee et al. |
| 2005/0109674 A1 | 5/2005 | Klein |
| 2005/0241991 A1 | 11/2005 | Lott et al. |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0079396 A1 | 4/2006 | Saito |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0090018 A1 | 4/2007 | Keusenkothen et al. |
| 2007/0158236 A1 | 7/2007 | Zhou et al. |
| 2007/0158238 A1 | 7/2007 | Wu et al. |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2009/0173666 A1 | 7/2009 | Zhou et al. |

FOREIGN PATENT DOCUMENTS

| | | |
|---|---|---|
| DE | 2324441 | 12/1973 |
| DE | 2421934 | 11/1974 |
| EP | 0199399 | 10/1986 |
| EP | 0559399 | 9/1993 |
| EP | 2421934 | 9/1993 |
| EP | 01043069 | 10/2000 |
| JP | 06346064 | 12/1994 |
| JP | 2003193074 | 7/2003 |
| WO | WO 2006-116913 | 11/2006 |

OTHER PUBLICATIONS

U.S. Appl. No. 11/327,085, filed Apr. 2, 2009, Office Action.
U.S. Appl. No. 11/327,085, filed Oct. 27, 2009, Notice of Allowance.
U.S. Appl. No. 11/461,652, filed Sep. 30, 2009, Office Action.
U.S. Appl. No. 11/461,652, filed Mar. 8, 2010, Office Action.
U.S. Appl. No. 11/461,652, filed Aug. 5, 2010, Notice of Allowance.
U.S. Appl. No. 11/968,861, filed Sep. 16, 2010, Office Action.
U.S. Appl. No. 11/968,861, filed Feb. 2, 2011, Notice of Allowance.
U.S. Appl. No. 11/968,934, filed Sep. 20, 2010, Office Action.
U.S. Appl. No. 11/968,934, filed Jan. 25, 2011, Office Action.
U.S. Appl. No. 12/140,629, filed Mar. 3, 2011, Office Action.
U.S. Appl. No. 11/327,249, filed Jan. 6, 2006, Zhou et al.
Papaioannou et al., "Alkali-Metal- and Alkaline-Earth-Promoted Catalysts for Coal Liquefaction Applications", Energy & Fuels, vol. 4, No. 1, pp. 38-42 (1990).
Database CA [online] Chemical Abstracts Service retrieved from STN Database accession No. 1991:42412.
Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998, XP009117504.

HIGHLY STABLE HYDROCARBON-SOLUBLE MOLYBDENUM CATALYST PRECURSORS AND METHODS FOR MAKING SAME

CROSS-REFERENCE TO RELATED APPLICATION

This application claims the benefit of U.S. Provisional Application No. 61/615,503, filed Mar. 26, 2012, the disclosure of which is incorporated herein in its entirety.

BACKGROUND OF THE INVENTION

1. Field of the Invention

The present invention is in the field of catalysts for use in upgrading heavy oil feedstocks into lower boiling, higher quality materials. More particularly, the invention relates to thermally stable catalyst precursors containing molybdenum salts that can be mixed with heavy oil feedstocks to form a hydroprocessing catalyst in situ within heavy oil.

2. Related Technology

World demand for refined fossil fuels is ever-increasing and will eventually outstrip the supply of high quality crude oil. As the shortage of high quality crude oil increases there is increasing demand to find ways to better utilize lower quality feedstocks and extract fuel values from them.

Lower quality feedstocks are characterized as including relatively high quantities of hydrocarbons having a boiling point of 524° C. (975° F.) or higher. They also contain relatively high concentrations of sulfur, nitrogen and/or metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment (e.g., through formation of coke and sediment).

Examples of lower quality feedstocks that contain relatively high concentrations of asphaltenes, sulfur, nitrogen and metals include heavy crude and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

Converting heavy oil into useful end products requires extensive processing, including reducing the boiling point of the heavy oil, increasing the hydrogen-to-carbon ratio, and removing impurities such as metals, sulfur, nitrogen and carbon forming compounds.

When used with heavy oil, existing commercial catalytic hydrocracking processes easily become fouled or rapidly undergo catalyst deactivation due to sintering and coking. The undesirable reactions and fouling involved in hydrocracking heavy oil greatly increases the catalyst material and maintenance costs of processing heavy oils, making current catalysts unsuitable for hydroprocessing heavy oil.

U.S. Pat. No. 5,578,197 to Cyr et al. discloses an effective technology for hydroprocessing heavy oils using a hydrocarbon-soluble molybdenum salt that decomposes in the heavy oil during hydroprocessing to form, in situ, a hydroprocessing catalyst, namely molybdenum sulfide. Once formed in situ, the molybdenum sulfide catalyst is highly effective at breaking up asphaltenes and other complicated hydrocarbons while preventing fouling and coking.

A significant problem with commercializing oil soluble molybdenum catalysts such as the one in Cyr et al. is the cost of the catalyst. Even small improvements in catalyst performance can have a significant benefit to the cost of the hydrocracking process due to the increase in output and/or the reduced use of the catalyst.

The performance of oil soluble molybdenum catalysts depends significantly on the concentration of the catalyst metal in the heavy oil and on how well the catalyst precursor can be dispersed within the heavy oil. U.S. Pat. No. 7,670,984 to Wu et al, incorporated herein by reference, discloses molybdenum based compounds used as a catalyst precursor (hereafter referred to as the "'984 patent catalyst precursor") that can increase the percent of metal in the catalyst while maintaining or improving solubility in heavy oil, leading to improved efficiency of processes for hydrocracking heavy oils using oil soluble molybdenum catalyst precursor compounds.

SUMMARY OF THE INVENTION

The present invention relates to catalyst precursors comprised of hydrocarbon soluble molybdenum salts that can form a hydrocracking catalyst in situ within heavy oil for upgrading heavy oil feedstocks. According to one embodiment, preferred catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. More preferably, each carboxylate anion may have between 8 and 17 carbon atoms, and most preferably between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In an alternative embodiment, a second category of preferred catalyst precursors that have been found to provide a superior combination of properties consisting of oil solubility and thermal stability include molybdenum salts comprising a plurality of cationic molybdenum atoms and a plurality of carboxylate anions selected from 10-undecenoate, dodecanoate, and combinations thereof. Examples of carboxylate anions that fit at least one of the foregoing categories are carboxylate anions derived from carboxylic acids selected from the group consisting of 10-undecenoic acid, dodecanoic acid, and combinations thereof.

In a more preferred embodiment, carboxylate anions for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability compared to the '984 patent catalyst precursors and comparable or superior oil solubility.

The present invention also includes methods for manufacturing molybdenum catalyst precursors. Exemplary methods for making the catalyst precursors generally include (1) providing a plurality of molybdenum atoms; (2) providing one or more carboxylic acids or carboxylate anions formed from carboxylic acids as described above (e.g., selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof); and (3) reacting the plurality of molybdenum atoms with the carboxylic acid at a temperature greater than about 100° C. and in the presence of a reducing agent. The reaction yields a molybdenum salt wherein the molybdenum atoms can have a desired average oxidation state.

The oxidation state of the molybdenum moieties in the catalyst precursors disclosed herein will typically fall within a range of 4+ to 6+, although it is possible for the oxidation state of at least some molybdenum atoms to be 3+. In one embodiment, at least a portion of the molybdenum atoms can be coordinated with at least 3 organic anions. Whether or not a molybdenum compound that includes 3 ligands has an oxidation state of 3+ or 5+ may depend on whether the molybdenum is double bonded with an oxide moiety. Similarly, whether or not a molybdenum compound that includes 4 ligands has an oxidation state of 4+ or 6+ may depend on whether the molybdenum is double bonded with an oxide moiety.

The catalyst precursors of the present invention typically have a first decomposition temperature higher than 210° C., preferably higher than about 225° C., more preferably higher than about 230° C., even more preferably higher than about 240° C., and most preferably higher than about 275° C. In some cases, the first decomposition temperature can be higher than about 290° C.

The catalyst precursors of the present invention typically have a peak decomposition temperature higher than 250° C., preferably higher than about 260° C., more preferably higher than about 270° C., even more preferably higher than about 280° C., and most preferably higher than about 290° C. In some cases, the peak decomposition temperature can be higher than about 330° C.

Furthermore, catalyst precursors as disclosed herein maintain catalytic selectivity, metal percentage, solubility and catalytic activity at levels comparable or superior to those in prior art, but with higher thermal stability. The catalyst performance of these compounds was tested by an autoclave reactor. For example, hydrogen activity and the product oil analysis show that the catalysts perform at least as well as molybdenum 2-ethylhexanoate, but with substantially higher thermal stability.

In one embodiment of the invention, the carboxylate anions have a group which provides high steric hindrance to shield the molybdenum metal center, which is believed to lead to higher first and/or peak decomposition temperatures and/or higher water tolerance. Groups that can provide high steric hindrance to shield the molybdenum metal center include cyclic and/or highly branched structures, as are found in many of the disclosed embodiments.

To obtain a catalyst precursor with at least a portion of the molybdenum atoms in a desired oxidation state, the catalyst precursor can be made using a reducing agent. Suitable reducing agents include hydrogen, metal hydrides and/or organic reducing agents. The reducing agent reduces and stabilizes the molybdenum atoms during the reaction between the carboxylate anions and the molybdenum atoms and can reduce or eliminate formation of molybdenum oxides. Water is removed to make the reaction product soluble in heavy oil.

The use of a reducing agent can also be advantageous for preventing formation of undesired complexes between the molybdenum atoms and oxidized species of the carboxylate anions. The presence of the reducing agent inhibits the carboxylate molecules from oxidizing one another and rapidly reduces the molybdenum atoms. By quickly reducing the molybdenum atoms and inhibiting the undesired oxidation of the carboxylate anions, the catalyst precursors of the present invention are less likely to form complexes between molybdenum atoms and undesired oxidized carboxylate species, which can reduce performance of the catalyst precursor in the heavy oil.

It is believed that the reducing agent can be helpful in reducing the amount of molybdenum oxides remaining in the final product and/or to reduce the amount of water bound to the molybdenum atoms and/or molybdenum salts. Hydrogen can be particularly effective at removing molybdenum oxides and/or water bound to the molybdenum salts. Catalyst precursors manufactured in the presence of hydrogen and/or organic reducing agents under the reaction conditions described herein have been found to have particularly good solubility and dispersion in hydrocarbons. It is believed that this increased solubility over existing catalyst precursors is due in part to the elimination of molybdenum oxides and/or to removal of bound water and/or undesired molybdenum complexes. However, the invention is not limited to these features of the invention.

The molybdenum catalyst precursors can be used in various kinds of reactors and hydrocracking processes to upgrade heavy oil by being converted in situ in an active hydroprocessing catalyst. The molybdenum catalyst precursors disclosed herein generally have high oil solubility and high decomposition temperature. When ligands provide high steric hindrance, it is believed they may impart moisture stability (e.g., so as to avoid forming water insoluble agglomerates) as compared to the preferred '984 patent catalyst precursor, making the storage of the inventive catalyst precursors easier and less costly. Meanwhile, active catalysts formed from the disclosed molybdenum catalyst precursors maintain high efficiency in processing asphaltene molecules, reduce or eliminate the formation of coke precursors and sediment, reduce equipment fouling, and/or increase conversion rates as compared to conventional hydroprocessing catalysts.

These and other benefits and advantages of the present invention will become more fully apparent from the following description and appended claims as set forth hereinafter.

BRIEF DESCRIPTION OF THE DRAWINGS

Further features and advantages of the invention will be shown by the following detailed description of the preferred embodiments of the present invention combined with the drawings in which.

DETAILED DESCRIPTION OF THE PREFERRED EMBODIMENTS

I. Introduction and Definitions

Figure 1:
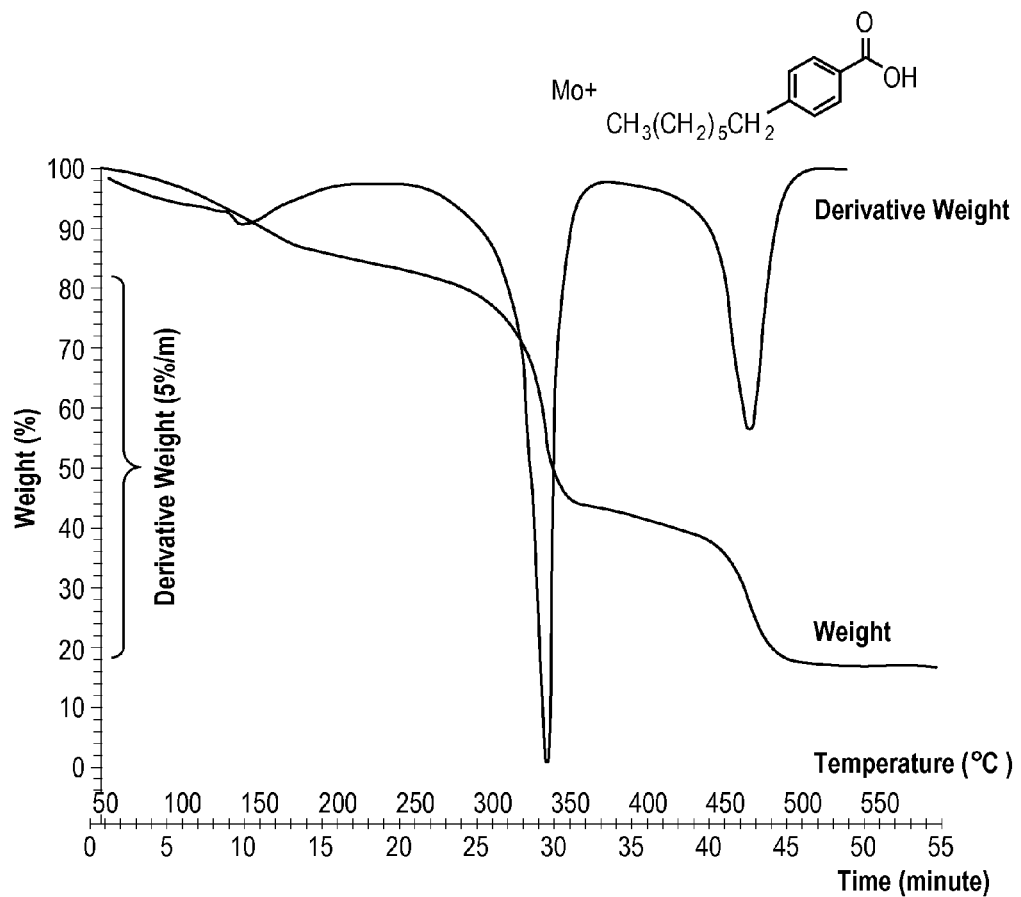
FIG. 1 shows the thermal gravimetric analysis (TGA) plot for molybdenum 4-heptyl-benzoate.

The present invention relates to hydrocarbon soluble molybdenum catalyst precursors that can form activated hydroprocessing molybdenum catalysts in situ within heavy oil feedstocks. The invention also relates to methods of making and using the hydrocarbon-soluble molybdenum catalyst precursors. The molybdenum catalyst precursors include a plurality of molybdenum atoms in a given oxidation state bonded to a plurality of anionic organic molecules. The molybdenum catalyst precursors may be stable at highly temperatures and resist agglomeration during storage and prior to use.

The term "first decomposition temperature" refers to an inflection point of a derivative weight loss curve (%/min) measured by thermal gravimetric analysis (TGA), which indicates the temperature at which the composition has begun losing its mass at a significant rate.

The term "peak decomposition temperature" refers to a local maximum of a derivative weight loss curve (%/min) measured by thermal gravimetric analysis (TGA), which indicates the temperature at which the composition is losing its mass at a maximum rate.

The terms "colloidal catalyst" and "colloidally-dispersed catalyst" shall refer to catalyst particles formed in situ from catalyst precursors having a particle size that is colloidal in size, e.g., less than about 1 micron in diameter, such as less than about 500 nm in diameter, preferably less than about 100 nm in diameter, more preferably less than about 50 nm in diameter, even more preferably less than about 20 nm in diameter, and most preferably less than about 10 nm in diameter (e.g., less than about 3 nm in diameter). The term "colloidal catalyst" includes, but is not limited to, molecular or molecularly-dispersed catalyst compounds.

The terms "molecular catalyst" and "molecularly-dispersed catalyst" shall refer to catalyst compounds that are essentially "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The terms "blended feedstock composition" and "conditioned feedstock" shall refer to a heavy oil feedstock into which an oil soluble catalyst precursor composition has been combined and mixed sufficiently so that, upon properly executed decomposition of the catalyst precursor and formation of the catalyst, the catalyst will comprise a colloidal or molecular catalyst dispersed within the feedstock. For example, if the mixing provides essentially complete dissolution and/or a high level of dispersion of the catalyst precursor prior to decomposition, the resulting active catalyst will be colloidal or molecular or molecular in size.

The term "heavy oil feedstock" shall refer to heavy crude, oil sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, or coal tar feedstocks to distillation, hot separation, and the like and that contains higher boiling fractions and/or asphaltenes.

II. Components Used to Manufacture Molybdenum Catalyst Precursors

The manufacture of molybdenum catalyst precursors as disclosed herein typically involves reacting a plurality of molybdenum atoms with a plurality of carboxylic acid molecules in the presence of a reducing agent. If needed, the reaction can be carried out in a solvent.

A. Transition Metal Atoms

The primary metal component of the oil catalyst precursors is molybdenum. The molybdenum atoms are provided as a molybdenum compound capable of reacting with a carboxylic acid or salt thereof (e.g., 4-heptylbenzoic acid, 5-phenylvaleric acid or other carboxylic acid or salt thereof disclosed herein) to form a molybdenum salt. Suitable starting molybdenum compounds include molybdenum halides, such as molybdenum hexafluoride and molybdenum pentachloride, various oxides of molybdenum, such as molybdenum dioxide, trioxide and sesquioxide, and the like; alkali and alkali earth molybdates such as cesium molybdate, sodium molybdate, potassium molybdate, calcium molybdate and the like; and ammonium molybdate or molybdic acid. According to one embodiment, ammonium molybdate can be used.

Other transition metals can also be included in the catalyst precursors of the present invention. The transition metal can be included in the reaction with carboxylic acids and/or blended with the molybdenum salts after manufacture. Any transition metal known to have catalytic activity or other beneficial properties, including but not limited to promoting catalysis, can be used. A preferred additional transition metal is one or more cobalt, zinc or iron.

B. Carboxylic Acids

Carboxylic acids useful for forming molybdenum precursor compounds as disclosed include one or more carboxylic acids having at least one carboxylate group and at least 8 carbon atoms suitable for reacting with a transition metal to form the anion of an oil-soluble transition metal salt (e.g., a molybdenum salt). In a preferred embodiment, suitable catalyst precursors include a molybdenum salt comprising a plurality of cationic molybdenum atoms and a plurality of carboxylate anions of at least 8 carbon atoms and that are at least one of (a) aromatic, (b) alicyclic, or (c) branched, unsaturated and aliphatic. More preferably, each carboxylate anion has between 8 and 17 carbon atoms, and most preferably between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In an alternative embodiment, a second category of preferred catalyst precursors found to provide a superior combination of desirable properties, such as oil solubility and thermal stability, include a molybdenum salt comprising a plurality of cationic molybdenum atoms and a plurality of carboxylate anions selected from 10-undecenoate, dodecanoate, and combinations thereof. Examples of carboxylate anions that fit at least one of the foregoing categories include carboxylate anions derived from carboxylic acids selected from the group consisting of 10-undecenoic acid, dodecanoic acid, and combinations thereof.

In a more preferred embodiment, carboxylate anions for use in making oil soluble, thermally stable molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability compared to other catalyst precursors known in the art and comparable or superior oil solubility.

Those skilled in the art will recognize that the carboxylic acid molecules can be modified during the reaction with the molybdenum atoms. For example, in the reaction of a carboxylic acid with molybdenum the carboxylic acid molecules can lose hydrogen to become a carboxylate anion. In this way, carboxylic acids and their salts can be essentially interchangeable.

In some cases, the carboxylic acid can function as a solvent for the reaction. This is typically the case where the carboxylic acid is a liquid under the reaction conditions. However, if needed, other solvents may be used, as in the case of biphenyl-2-carboxylic acid, which has a melting point of 111-113° C., higher than the lower limit of the typical reaction temperature range of 100-350° C. The additional solvent should dissolve the carboxylic acid and the molybdenum atoms and not interfere with the reaction between them. Suitable solvents include acetic anhydride, decant oil, liquid paraffin wax, benzene, toluene, xylene, naphtha, mineral oil, mineral spirits, combinations thereof, and the like.

C. Reducing Agents

According to one embodiment, at least a portion of the molybdenum atoms can be reduced from a higher oxidation state to a lower oxidation state (e.g., in order to reduce or eliminate the incidence of molybdenum oxides and or agglomerates comprised of oxides of carboxylic acids.

In one embodiment, the method of the present invention produces a catalyst precursor with an oxidation state of 4+ even though each molybdenum may be coordinated with three or four organic ligands. Providing molybdenum atoms having an oxidation state of 4+ is advantageous to the extent this valence is the valence of the active colloidal or molecular $MoS_2$ catalyst when heated to decompose the precursor and form the active catalyst in situ. Moreover, because the conditions within a hydroprocessing reactor are generally reducing conditions, it may be difficult to oxidize $MO^{3+}$ species to $Mo^{4+}$ species in situ. Nevertheless, it is within the scope of the disclosure for the catalyst precursor to include $Mo^{3+}$ species, particularly when mixed with $Mo^{4+}$ species.

However, reducing the oxidation state of the molybdenum atoms from 6+ to 4+ can beneficially increases the percentage of molybdenum in the catalyst precursor as compared to oil soluble molybdenum salts, which typically have an oxidation state greater than 4+ or 5+. The inventors have found that molybdenum coordinated with three or four organic anions can remain sufficiently soluble in heavy oil while increasing the weight percent of molybdenum. Increasing the percentage of molybdenum in the catalyst precursor can significantly reduce the cost of the catalyst precursor, as well as storage and shipping costs due to smaller weight and volume per quantity of catalyst metal provided by the catalyst precursor.

The use of a reducing agent can also be advantageous for preventing formation of undesired complexes between the molybdenum atoms and oxidized species of carboxylate anions. The presence of the reducing agent inhibits carboxylate molecules from oxidizing one another and rapidly reduces the molybdenum atoms. By quickly reducing the molybdenum atoms and inhibiting the undesired oxidation of the carboxylate anions, the catalyst precursors of the present invention are less likely to form complexes between molybdenum atoms and undesired oxidized carboxylate species, which can reduce performance of the catalyst precursor in the heavy oil (e.g., by forming less soluble agglomerates).

It is believed that the reducing agent can be helpful in reducing the amount of molybdenum oxides remaining in the final product and/or to reduce the amount of water bound to the molybdenum atoms and/or molybdenum salts. Hydrogen can be particularly effective at removing molybdenum oxides and/or water bound to the molybdenum salts. Catalyst precursors manufactured in the presence of hydrogen and/or organic reducing agents under the reaction conditions described herein have been found to have particularly good solubility and dispersion in hydrocarbons. It is believed that this increased solubility over existing catalyst precursors is due in part to the elimination of molybdenum oxides and/or to removal of bound water and/or undesired molybdenum complexes. However, the invention is not limited to these features of the invention.

A reducing agent can be added to the reaction mixture to reduce the metal atoms to more readily form the metal salts and/or to obtain metal salts with a desired weight percent of metal in the catalyst precursor. In a preferred embodiment, a strong reducing agent is used to reduce and/or maintain at least a portion of the molybdenum atoms in an oxidation state of 4+.

Any reducing agent that can reduce molybdenum to a desired oxidation state under appropriate reaction conditions can be used in the disclosed methods. The reducing agent is preferably hydrogen or an organic reducing agent. Suitable reducing agents include methane, ethane, olefins such as ethylene and propylene, aldehydes such as formaldehyde, metal hydrides such as lithium aluminum hydride and sodium borohydride, and hydrogen. Hydrogen gas is a particularly preferred reducing agent because of its effectiveness and low cost.

The suitability of the reducing agent often depends on the temperature at which the reaction is performed. At higher temperatures (e.g., 155° C.), organic reducing agents such as methane and formaldehyde have suitable reducing potential. However, at low temperatures (e.g., below 50° C.) or room temperature it can be advantageous to use a stronger reducing agent such as hydrogen gas.

III. Methods of Making Molybdenum Hydroprocessing Catalyst Precursors

Methods for making molybdenum hydroprocessing catalyst precursors as disclosed may comprise direct reaction of a plurality molybdenum atoms with a plurality of carboxylic acid molecules to form a hydrocarbon-soluble molybdenum salt. The reaction can be carried out at a molar ratio of carboxylic acid molecules to molybdenum atoms of less than about 20:1, preferably less than about 10:1, more preferably less than about 5:1, even more preferably less than about 4:1, and most preferably less than about 3.5:1.

According to one embodiment, the reaction of molybdenum atoms and carboxylic acid molecules may be carried out in the presence of a reducing agent. The reducing agent lowers the oxidation state of the molybdenum atoms. The molybdenum atoms, which can be provided as molybdenum oxide, are preferably reduced such that, according to one embodiment, substantially no molybdenum oxide remains. Eliminating at least some molybdenum oxides may improve the solubility of hydrocarbon-soluble molybdenum salts in heavy oil or other hydrocarbons in comparison to commercially available hydrocarbon-soluble molybdenum salts that are overly oxidized.

In one embodiment, the reducing agent and reaction conditions allow for the molybdenum to be reduced to an average oxidation state of less than 5+ or 4+ depending on the number of coordinating ligands per molybdenum atom. The reaction is carried out in a way that achieves a hydrocarbon-soluble molybdenum salt that has molybdenum atoms with an average oxidation state of less than 5+ or 4+. In one embodiment, the formation of molybdenum salts with a desired oxidation state is achieved by reacting the molybdenum compound and the carboxylic acid molecules in a molar ratio of carboxylic acid molecules to molybdenum atoms in the presence of a reducing agent.

In a preferred embodiment, the reducing agent is hydrogen gas, which is passed through or by the reaction mixture to produce the reducing environment. According to one embodiment, catalyst precursors having molybdenum atoms with a lower average oxidation state can have improved solubility in heavy oil, which improves the in situ formation of the molybdenum sulfide catalyst. In addition, catalyst with a lower oxidation state can have fewer carboxylic acid molecules per molybdenum atom, thereby increasing the molybdenum concentration and reducing cost.

The reaction is preferably carried out at elevated temperatures. At elevated temperatures (e.g., above 100° C.), the solubility of the molybdenum compounds increases and a more complete reaction with the carboxylic acid can be achieved. However, the reaction temperature is preferably maintained below about 350° C. to prevent the molybdenum salts from decomposing. In a preferred embodiment, the reaction is carried out at a temperature of from about 100° C. to about 350° C., more preferably between about 120° C. to about 300° C., and most preferably between about 150° C. to about 260° C. It should be understood that, among other factors, the temperature and duration of the reaction can depend upon the particular molybdenum compound and/or the particular carboxylic acid used. The reaction is carried out for a sufficient length of time to allow for substantial reaction to take place, which is typically between about 2 hours and about 48 hours or more.

Maintaining a reducing environment during the reaction can be particularly advantageous because it causes the reaction between the molybdenum and the carboxylic acid to occur more quickly. In addition, the presence of the reducing agent reduces the opportunity for the carboxylic acid molecules to oxidize one another, which could otherwise result in the formation of undesired molybdenum complexes. The presence of the reducing agent during the reaction also helps stabilize the molybdenum atoms in the desired oxidation state.

Water is removed from the reaction mixture to obtain a reaction product that is soluble in heavy oil and to ensure that the molybdenum reaction proceeds. The water can be removed using any technique or combination of techniques. In a preferred embodiment, the reaction is carried out under conditions that exceed the boiling point of water such that water vapor is removed as it is formed during the reaction. The water is allowed to escape from the reaction vessel as water vapor. Where hydrogen and/or another gas is being contacted with the reaction mixture, the water can escape with the gas. If desired, the gas and water vapor can be passed through a condenser to remove the water. Optionally, the dried gas can then be recycled through the reaction mixture.

It is believed that the reducing agent can be helpful to reduce the amount of water bound or complexed to the molybdenum atoms of the molybdenum salt and/or to reduce molybdenum oxide species. Catalyst precursors manufactured in the presence of hydrogen have been found to have particularly good solubility and dispersion in hydrocarbons. It is believed that this increased solubility over existing catalyst precursors is due in part to the removal of bound water and/or molybdenum oxide species that are not easily removed by heating. It is also believed to be advantageous to remove molybdenum oxides and/or bound water during the reaction and/or at elevated temperatures and/or in a reducing environment.

If needed, chemical drying agents can be employed to remove water from the reaction product, although this is usually not necessary. Any known drying technique can be used. For example, water may be removed by the use of dehydrating agents such as calcium chloride or an azeotropic agent. Those skilled in the art are familiar with dehydrating agents and azeotropic agents.

IV. Catalyst Precursor Compositions

The oil soluble catalyst precursors of the present invention comprise a hydrocarbon-soluble molybdenum salt. The molybdenum salt preferably comprises a plurality of cationic molybdenum atoms and a plurality of carboxylate anions of at least 8 carbon atoms and that are at least one of (a) aromatic, (b) alicyclic, or (c) branched, unsaturated and aliphatic. More preferably, each carboxylate anion has between 8 and 17 carbon atoms, and most preferably between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In an alternative embodiment, the molybdenum salt comprises a plurality of cationic molybdenum atoms and a plurality of carboxylate anions selected from 10-undecenoate, dodecanoate, and combinations thereof. Examples of carboxylate anions that fit at least one of the foregoing categories include carboxylate anions derived from carboxylic acids selected from the group consisting of 10-undecenoic acid, dodecanoic acid, and combinations thereof.

In a more preferred embodiment, the molybdenum salt comprises a plurality of cationic molybdenum atoms and a plurality of carboxylate anions selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability compared to other catalyst precursors known in the art and comparable or superior oil solubility.

The molybdenum content within the molybdenum salt is directly dependent on the number of organic anions bound to it and the molecular weight of the organic anions. As the number and weight of the organic anion increases, the weight percent of molybdenum decreases. As mentioned above, a higher weight percent of molybdenum is desired, so long as the catalyst precursor is soluble in hydrocarbons such as heavy oil. The inventors of the present invention have found that the number of organic anions per molybdenum atom can be reduced to 4+ or 3+ while still maintaining sufficient solubility in hydrocarbons such as heavy oil.

According to one embodiment, catalyst precursors can have an average oxidation state of less than 5+ in the case where molybdenum is coordinated with four organic ligands and less than 4+ in the case where molybdenum is coordinated with three organic ligands. According to one embodiment, the $Mo^{3+}$ species is used because it is believed that catalyst precursors made using molybdenum of this valence enhances in situ formation of the active sulfide molybdenum catalyst (e.g., $MoS_2$). The $Mo^{3+}$ species may, however, be less stable than other forms of molybdenum, such as $Mo^{4+}$, $Mo^{5+}$, and $Mo^{6+}$. If $Mo^{3+}$ is less stable, it can more readily decompose in heavy oil and form the desired catalytic molybdenum sulfide compounds as compared to molybdenum compounds of higher oxidation state. While the foregoing theories are believed to contribute at least in part to the improved performance of the catalysts of the present invention, the invention is not limited to these theories.

Reducing the oxidation state of the molybdenum atoms to less than 5+ or 4+ also increases the percentage of molybdenum in the catalyst precursor as compared to existing oil soluble molybdenum salts, which typically have an oxidation state equal to or greater than 4+ or 5+. The inventors have found that molybdenum coordinated with three organic anions can remain sufficiently soluble in heavy oil while increasing the weight percent of molybdenum. Increasing the percentage of molybdenum in the catalyst precursor can significantly reduce the cost of the catalyst precursor.

V. Hydrocarbons Blended with Catalyst Precursors and Hydroprocessing Catalysts Formed Therefrom The catalyst precursors of the present invention can be included in a heavy oil feedstock to form a blended or conditioned feedstock composition. The catalyst precursors are designed to remain stable in a hydrocarbon up to a desired temperature. At an elevated temperature, the catalyst precursors decompose and react with sulfur in the heavy oil to form a molybdenum sulfide hydroprocessing catalyst.

The catalyst precursors of the present invention typically have a first decomposition temperature higher than 210° C., preferably at least about 225° C., more preferably at least about 230° C., even more preferably at least about 240° C., and most preferably at least about 275° C. In some case, the first decomposition temperature can be higher than about 290° C.

The catalyst precursors of the present invention typically have a peak decomposition temperature of at least 250° C., preferably at least about 260° C., more preferably at least about 270° C., even more preferably at least about 280° C., and most preferably at least about 290° C. In some case, the peak decomposition temperature can be higher than about 330° C.

These preferred decomposition temperatures provide high thermal stability and allow the catalyst precursor to be thoroughly mixed in a hydrocarbon (e.g., heavy oil) before substantial decomposition occurs. This, in turn, inhibits or prevents formation of agglomerates or micron-scale particles (i.e., particles larger than 1 micron).

The catalyst precursors can also be mixed with a diluent to form a mixture with a desirable concentration of molybdenum salt. Examples of suitable hydrocarbon diluents include, but are not limited to, vacuum gas oil (which typically has a boiling range of 360-524° C.), decant oil (which typically has a boiling range of 360-550° C.), light gas oil (which typically has a boiling range of 200-360° C.), and cycle oil.

The weight ratio of catalyst precursor to hydrocarbon oil diluent is preferably in a range of about 1:1000 to about 1:1, more preferably in a range of about 1:100 to about 1:1, and most preferably in a range of about 1:30 to about 1:1 (e.g., 1:20, 1:5 or 1:3).

The catalyst precursor can also be pre-mixed with a diluent prior to mixing the precursor with the heavy oil feedstock. The catalyst precursor is advantageously mixed with the hydrocarbon diluent at a temperature below the catalyst precursor's decomposition temperature, preferably at temperatures in a range of about 25° C. to about 250° C., more preferably in a range of about 50° C. to about 200° C., and most preferably in a range of about 75° C. to about 150° C., to form the diluted precursor mixture. It will be appreciated that the actual temperature at which the diluted precursor mixture is formed typically depends largely on the decomposition temperature of the particular precursor composition that is utilized. The catalyst precursor is preferably mixed with the hydrocarbon oil diluent for a time period in a range of about 0.001 second to about 20 minutes, more preferably in a range from about 0.005 second to about 20 seconds, and most preferably in a range of about 0.01 second to about 3 seconds. The actual mixing time is dependent, at least in part, on the temperature (which affects the viscosity of the fluids) and mixing intensity. Mixing intensity is dependent, at least in part, on the number of mixing stages (e.g., for an in-line static mixer).

Whereas it is within the scope of the invention to directly blend the catalyst precursor with the heavy oil feedstock, care must be taken in such cases to mix the components for a time sufficient to thoroughly blend the catalyst precursor within the feedstock before substantial decomposition of the catalyst precursor has occurred. The catalyst precursors in this invention have higher decomposition temperatures than those in prior art, allowing for easier storage and more efficient mixing than existing catalysts. For example, U.S. Pat. No. 5,578, 197 to Cyr et al. describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive.

It has been found that pre-blending the catalyst precursor with a hydrocarbon diluent prior to blending the diluted precursor mixture with the heavy oil feedstock greatly aids in thoroughly and intimately blending the catalyst precursor within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor composition and the heavy oil feedstock, (2) reducing or eliminating differences in rheology between the catalyst precursor and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor composition can cause localized agglomeration of the catalyst precursor, resulting in poor dispersion and formation of micron-sized or larger catalyst particles. The hydrocarbon oil diluent is preferably substantially water-free (i.e., contains less than about 0.5% water) to prevent the formation of substantial quantities of micron-sized or larger catalyst particles.

The diluted precursor mixture is then combined with the heavy oil feedstock and mixed for a time sufficient and in a manner so as to disperse the catalyst precursor composition throughout the feedstock in order to yield a conditioned feedstock composition in which the catalyst precursor is thoroughly mixed within the heavy oil feedstock. In order to obtain sufficient mixing of the catalyst precursor within the heavy oil feedstock so as to yield a colloidal or molecular catalyst upon decomposition of the catalyst precursor, the diluted precursor mixture and heavy oil feedstock are preferably mixed (e.g., in a static low shear mixer) for a time period in a range of about 0.001 second to about 20 minutes, more preferably in a range from about 0.005 second to about 20 seconds, and most preferably in a range of about 0.01 second to about 3 seconds. Increasing the vigorousness and/or shearing energy of the mixing process generally reduces the time required to effect thorough mixing.

Thereafter, the conditioned feedstock may be further introduced into a surge tank, which can allow further diffusion of the catalyst precursor within the heavy oil. For example, the surge tank may provide a residence time in a range of about 5 minutes to about 60 minutes, preferably from about 10 minutes to about 50 minutes, and most preferably form about 20 minutes to about 40 minutes.

Examples of a mixing apparatus that can be used to effect thorough mixing of the catalyst precursor and heavy oil feedstock include, but are not limited to, high shear mixing such as mixing created in a vessel with a propeller or turbine impeller, multiple static in-line mixers, or one or more multi-stage centrifugal pumps. According to one embodiment, continuous rather than batch-wise mixing can be carried out using high energy pumps having multiple chambers within which the catalyst precursor and heavy oil feedstock are churned and mixed as part of the pumping process itself. The foregoing mixing apparatus may also be used for the pre-mixing process discussed above in which the catalyst precursor is mixed with the hydrocarbon oil diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the catalyst precursor into the feedstock composition. In general, decreasing the viscosity of the heavy oil feedstock will reduce the time required to effect thorough and intimate mixing of the catalyst precursor within the feedstock. However, the feedstock should not be heated to a temperature above which significant decomposition of the catalyst precursor occurs until after thorough and complete mixing to form the blended feedstock composition. Prematurely decomposing the catalyst precursor generally results in the formation of micron-sized or larger catalyst particles rather than a colloidal or molecular catalyst. The heavy oil feedstock and diluted precursor mixture are preferably mixed and conditioned at a temperature in a range of about 25° C. to about 350° C., more preferably in a range of about 50° C. to about 300° C., and most preferably in a range of about 75° C. to about 250° C. to yield the conditioned feedstock.

After the catalyst precursor has been well-mixed throughout the heavy oil feedstock so as to yield the conditioned feedstock composition, this mixture is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the heavy oil feedstock to a temperature sufficient to liberate the sulfur therefrom. In some cases, sulfur may be liberated at the same temperature that the catalyst precursor decomposes. In other cases, further heating to a higher temperature may be required.

If the catalyst precursor is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized or even micron-sized catalyst particles. However, it is believed that taking care to thoroughly mix the catalyst precursor throughout the feedstock will yield individual catalyst molecules rather than colloidal particles. Simply blending, while failing to sufficiently mix, the catalyst precursor with the feedstock typically causes formation of large agglomerated metal sulfide compounds that are micron-sized or larger.

In order to form the active metal sulfide catalyst, the blended feedstock composition is preferably heated to a temperature in a range of about 200° C. to about 500° C., more preferably in a range of about 250° C. to about 450° C., and most preferably in a range of about 300° C. to about 420° C. According to one embodiment, the conditioned feedstock is heated to a temperature that is about 100° C. less than the hydrocracking temperature within the hydrocracking reactor. According to one embodiment, the active catalyst is formed during preheating before the heavy oil feedstock is introduced into the hydrocracking reactor. According to another embodiment, at least a portion of the active catalyst is formed in situ within the hydrocracking reactor itself. Once formed, in some cases, the active catalyst can be formed as the heavy oil feedstock is heated to a hydrocracking temperature prior to or after the heavy oil feedstock is introduced into a hydrocracking reactor. The initial concentration of the catalyst metal provided by the active catalyst can be less than about 1000 ppm and is preferably in a range of about 1 ppm to about 500 ppm by weight of the heavy oil feedstock, more preferably in a range of about 5 ppm to about 300 ppm, and most preferably in a range of about 10 ppm to about 200 ppm. The catalyst metal may become more concentrated as volatile fractions are removed from the non-volatile resid fraction.

While the polar nature of the catalyst compound causes or allows the catalyst to associate with asphaltene molecules, it is the general incompatibility between highly polar catalyst compounds and hydrophobic heavy oil feedstocks that necessitates the aforementioned intimate or thorough mixing of the catalyst precursor with the heavy oil feedstock prior to decomposition of the catalyst precursor and formation of well-dispersed active catalyst particles. Because metal catalyst compounds are highly polar, they cannot be effectively dispersed within a heavy oil feedstock in colloidal or molecular form if added directly thereto or as part of an aqueous solution or an oil and water emulsion. Such methods inevitably yield micron-sized or larger catalyst particles.

VI. Examples

The following examples provide exemplary formulas for manufacturing catalyst precursors according to the present invention. Examples 1, 2, 3, 4, 5, 6, 7 and 8 provide formulas for making molybdenum carboxylates to be used as soluble catalyst precursors from the following carboxylic acids: (1) 4-heptyl-benzoic acid, (2) cyclohexane-butanoic acid, (3) 3-cyclopentyl-propanoic acid, (4) biphenyl-2-carboxylic acid, (5) 10-undecenoic acid, (6) dodecanoic acid, (7) geranic acid (3,7-dimethyl-2,6-octadienoic acid), and (8) 5-phenylvaleric acid, respectively.

Examples 9-12 are comparative examples that show molybdenum salts that could not be formed into oil soluble compounds and are therefore less suitable for forming the more preferred colloidal or molecular catalyst.

The molybdenum salts were prepared using a condenser attached to a flask. Condensate was removed by opening a valve. The catalyst precursors of examples 1-12 are diluted with a hydrocarbon and used for hydrocracking heavy oil. The composition of heavy oil is as follows—Elemental (wt %): Carbon 84.00%, Hydrogen 11.80%, Sulfur 3.79%, Nitrogen 0.43%, and Oxygen (calculated) trace. The oil distillation results (wt %, solids free) are: IBP—975° F. fraction of 55.67% and 975° F.+ fraction of 44.33%.

EXAMPLE 1

Example 1 describes a method for making a molybdenum catalyst precursor from 4-heptyl-benzoic acid and the activity of active catalyst formed therefrom for hydrocraking Arab heavy oil. In a 100 ml round bottom flask, a mixture of ammonium molybdate (2.00 g) and 4-heptylbezoic acid (8.89 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 μm filter, which yielded a clear, colorless, oil-soluble catalyst precursor.

The resulting molybdenum 4-heptylbenzoate was dispersed into 425.28 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The performance of the active catalyst formed from molybdenum 4-heptylbenzoate was tested by an autoclave reactor. The resulting hydrogen activity number was 285.8 and oil distillation wt % were IBP—650° F. 22.66% and 650° F.+ 75.99%. For comparison purpose, the hydroprocessing results of prior art molybdenum 2-ethylhexonoate were tested, which had a hydrogen activity number of 286.5 and oil distillation wt % of IBP—650° F. 22.6% and 650° F.+ 76.09%. See Table 1 below (embedded in Example 6). The results indicate that molybdenum 4-heptylbenzoate catalyst precursor performs similarly to prior art molybdenum 2-ethylhexanoate.

Thermal Gravimetric Analysis (TGA) was used to measure the mass of the catalyst precursor when it was heated at a specific rate in a defined temperature range. The catalyst precursor was loaded into a ceramic crucible and placed in TGA chamber with nitrogen purging. The heating rate used was 10° C./min through the temperature range of 25-600° C.

As shown in FIG. 1, the weight curve shows the weight percentage of the remaining composition as a function of time and temperature, and the derivative weight curve shows the corresponding rate of weight loss. The first trough of the TGA derivative weight curve corresponds to the first peak of decomposition temperature of molybdenum 4-heptylbenzoate, at which the composition decomposes at a maximum rate. Decomposition starts near 300° C., and peaks near 340° C. In comparison, prior art molybdenum 2-ethylhexanoate starts to decompose near 200° C.

EXAMPLE 2

Example 2 describes a method for making a molybdenum catalyst precursor. In a 100 ml round bottom flask, a mixture of ammonium molybdate (2.00 g) and cyclohexane-butyric acid (9.59 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 μm filter, which yielded a clear, colorless, oil-soluble catalyst precursor.

The resulting molybdenum cyclohexane-butanoate was dispersed into 425.73 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The catalyst performance of molybdenum cyclohexane-butanoate was tested by an autoclave reactor. The hydrogen activity number was 290.2 and the oil distillation wt % were IBP—650° F. 27.04% and 650° F.+ 72.06%. For comparison purpose, the hydroprocessing results of prior art catalyst molybdenum 2-ethylhexonoate were tested, which had a hydrogen activity number of 286.5 and the oil distillation wt % of IBP—650° F. 22.6% and 650° F.+ 76.09%. See Table 1 below (embedded in Example 6). The results indicate that molybdenum cyclohexane-butanoate catalyst precursor performed slightly better than molybdenum 2-ethylhexanoate.

Thermal Gravimetric Analysis (TGA) was used to measure the mass of molybdenum cyclohexane-butanoate when it was heated at a specific rate in a defined temperature range. The catalyst precursor was loaded into a ceramic crucible and placed in TGA chamber with nitrogen purging. The heating rate used was 10° C./min through the temperature range of 25-600° C.

Figure 2:
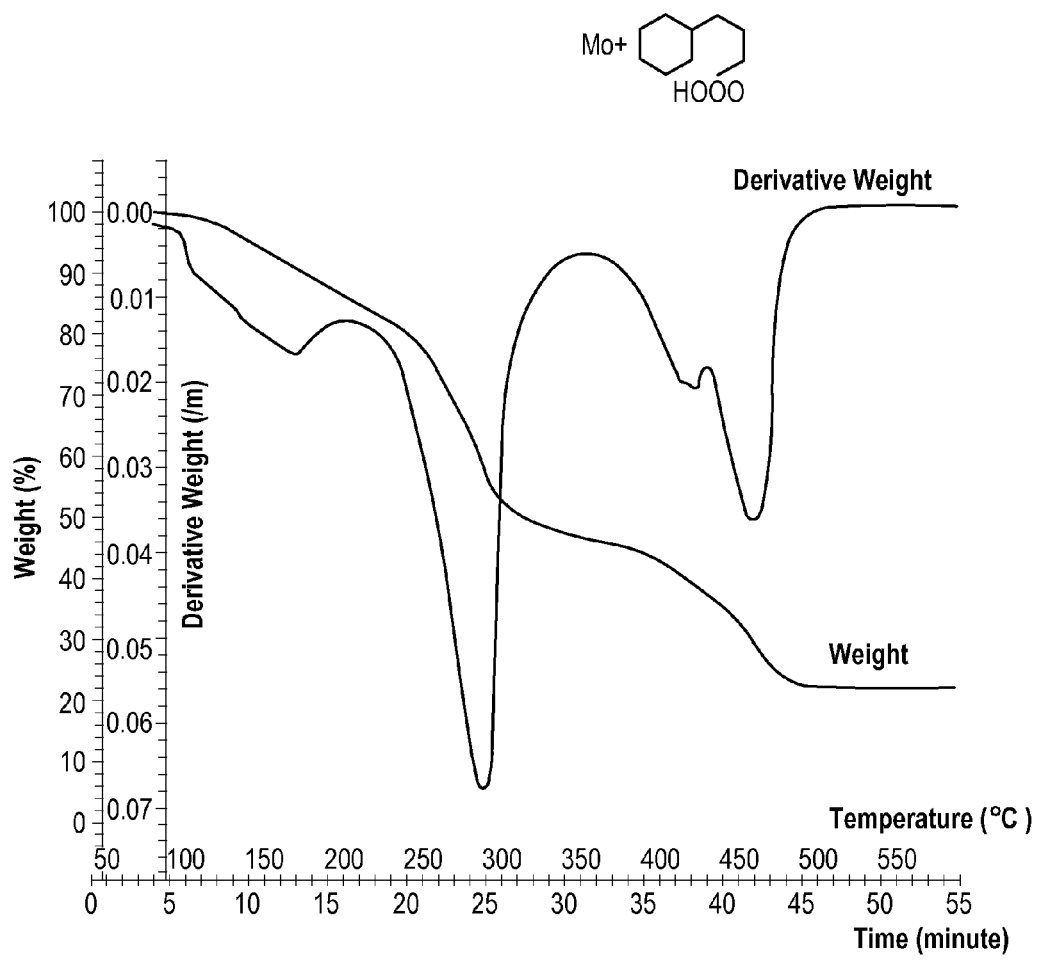
FIG. 2 shows the TGA plot for molybdenum cyclohexane-butanoate.

As shown in FIG. 2, the weight curve shows the weight percentage of the remaining molybdenum cyclohexane-butanoate as a function of time and temperature, and the derivative weight curve shows the corresponding rate of weight loss. The first trough of the TGA derivative weight curve corresponds to the first peak of decomposition temperature of molybdenum cyclohexane-butanoate, at which the composition decomposes at a maximum rate. Decomposition starts near 240° C., and peaks near 290° C., significantly higher than prior art molybdenum 2-ethylhexanoate.

EXAMPLE 3

Example 3 describes a method for making a molybdenum catalyst precursor. In a 100 ml round bottom flask, a mixture of ammonium molybdate (2.00 g) and 3-cyclopentyl-propanoic acid (5.63 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 μm filter, which yielded a clear, colorless, oil-soluble catalyst precursor.

The resulting molybdenum 3-cyclopentyl-propanoate was dispersed into 425.85 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The catalyst performance of molybdenum 3-cyclopentyl-propanoate was tested by an autoclave reactor. The hydrogen activity number was 293.3 and the oil distillation w % were IBP—650° F. 22.5% and 650° F.+ 76.01%. See Table 1 below (embedded in Example 6). The results indicate that molybdenum 3-cyclopentyl-propanoate catalyst precursor performs similarly to prior art molybdenum 2-ethylhexanoate.

Thermal Gravimetric Analysis (TGA) was used to measure the mass of molybdenum 3-cyclopentyl-propanoate. The catalyst precursor was loaded into a ceramic crucible and placed in TGA chamber with nitrogen purging. The heating rate used was 10° C./min through the temperature range of 25-600° C.

Figure 3:
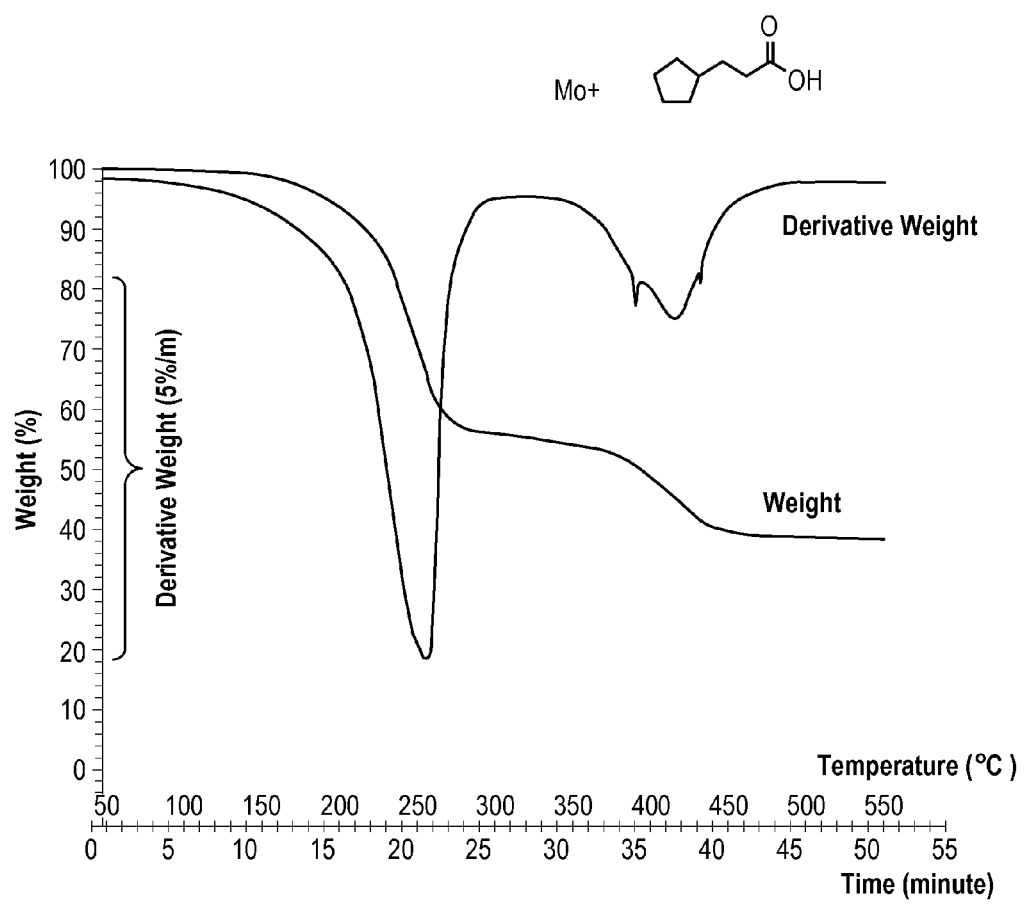
FIG. 3 shows the TGA plot for molybdenum 3-cyclopentyl-propanoate.

As shown in FIG. 3, the weight curve shows the weight percentage of the remaining molybdenum 3-cyclopentyl-propanoate as a function of time and temperature, and the derivative weight curve shows the corresponding rate of weight loss. The first trough of the TGA derivative weight curve corresponds to the first peak of decomposition temperature of molybdenum 3-cyclopentyl-propanoate, at which the composition decomposes at a maximum rate. Decomposition starts near 210° C., and peaks near 280° C., significantly higher than prior art molybdenum 2-ethylhexanoate.

EXAMPLE 4

Example 4 describes a method for making a molybdenum catalyst precursor. In a 100 ml round bottom flask, a mixture of ammonium molybdate (2.00 g) and biphenyl-2-carboxylic acid (8.08 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 µm filter, which yielded a clear, colorless, oil-soluble catalyst precursor.

The resulting molybdenum biphenyl-2-carboxylate was dispersed into 424.94 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The catalyst performance of molybdenum biphenyl-2-carboxylate was tested by an autoclave reactor. The hydrogen activity number was 290.3 and the oil distillation w % were IBP—650° F. 22.14% and 650° F.+ 75.95%. See Table 1 below (embedded in Example 6). The results indicate that molybdenum biphenyl-2-carboxylate catalyst precursor performs similarly to prior art molybdenum 2-ethylhexanoate.

Based on the number of carbons in each ligand and/or because each ligand includes two aromatic groups, the starting and peak decomposition temperatures of molybdenum biphenyl-2-carboxylate would be expected to be at least as high or higher than the starting and peak decomposition temperatures for at least one of the precursors made according to Examples 1-3 and 5-8.

Based on the number of carbons and/or because it include two aromatic groups, the starting and peak decomposition temperatures of molybdenum biphenyl-2-carboxylate would be expected to be at least as high or higher than the starting and peak decomposition temperatures for at least one of the precursors made according to Examples 1-3 and 5-8.

EXAMPLE 5

Example 5 describes a method for making a molybdenum catalyst precursor from 10-undecenoic acid and the activity of active catalyst made therefrom for hydrocraking Arab heavy oil. In a 100 ml round bottom flask, a mixture of ammonium molybdate (2.00 g) and 10-undecenoic acid (9.5 ml/8.71 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 µm filter, which yielded a clear, colorless, oil-soluble catalyst precursor.

The resulting molybdenum 10-undecenoate was dispersed into 425.42 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The catalyst performance of molybdenum 10-undecenoate was tested by an autoclave reactor. The hydrogen activity number was 297.2 and the oil distillation w % were IBP—650° F. 22.45% and 650° F.+ 76.01%. See Table 1 below (embedded in Example 6). The results indicate that molybdenum 10-undecenoate catalytic precursor performs similarly to molybdenum 2-ethylhexanoate.

Thermal Gravimetric Analysis (TGA) was used to measure the mass of molybdenum docecanoate. The catalyst precursor was loaded into a ceramic crucible and placed in TGA chamber with nitrogen purging. The heating rate used was 10° C./min through the temperature range of 25-600° C.

Figure 4:
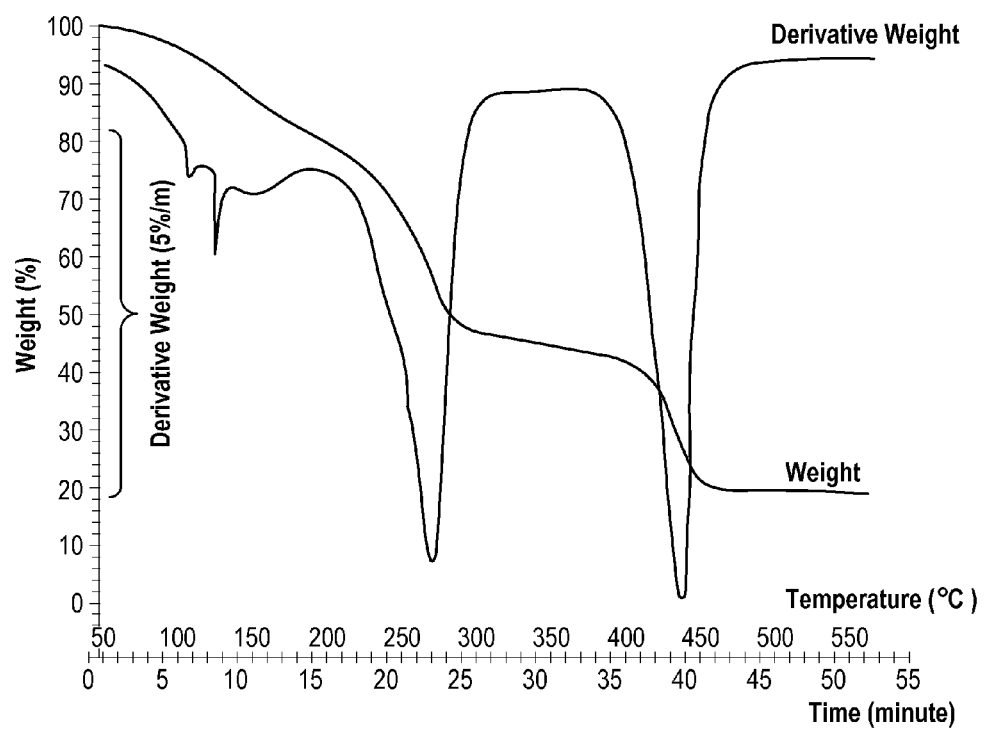
FIG. 4 shows the TGA plot for molybdenum 10-undecenoate.

As shown in FIG. 4, the weight curve shows the weight percentage of the remaining molybdenum 10-undecenoate as a function of time and temperature, and the derivative weight curve shows the corresponding rate of weight loss. The first trough of the TGA derivative weight curve corresponds to the first peak of decomposition temperature of molybdenum 10-undecenoate, at which the composition decomposes at a maximum rate. Decomposition starts near 230° C., and peaks near 290° C., significantly higher than prior art molybdenum 2-ethylhexanoate, which starts to decompose near 200° C.

EXAMPLE 6

Example 6 describes a method for making a molybdenum catalyst precursor. In a 100 ml round bottom flask, a mixture of ammonium molybdate (2.00 g) and dodecanoic acid (10.44 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 µm filter, which yielded a clear, colorless, oil-soluble catalyst precursor.

The resulting molybdenum dodecanoate was dispersed into 425.42 g Arab heavy feed, which confirmed its solubility in heavy oil, to yield 200 ppm Mo in the heavy feed. The reaction was conducted at 770° F. with $H_2$ pressure 2500 psi. The reaction time was 45 minutes. After the test, the hydrogen uptake number was measured and the product oil was analyzed.

The catalyst performance of molybdenum dodecanoate was tested by an autoclave reactor. The hydrogen activity number was 294.5 and the oil distillation w % were IBP—650° F. 22.53% and 650° F.+ 75.27%. See Table 1 below. The results indicate that molybdenum dodecanoate catalyst precursor performs similar to molybdenum 2-ethylhexanoate.

Thermal Gravimetric Analysis (TGA) was used to measure the mass of molybdenum dodecanoate. The catalyst precursor was loaded into a ceramic crucible and placed in TGA chamber with nitrogen purging. The heating rate used was 10° C./min through the temperature range of 25-600° C.

Figure 5:
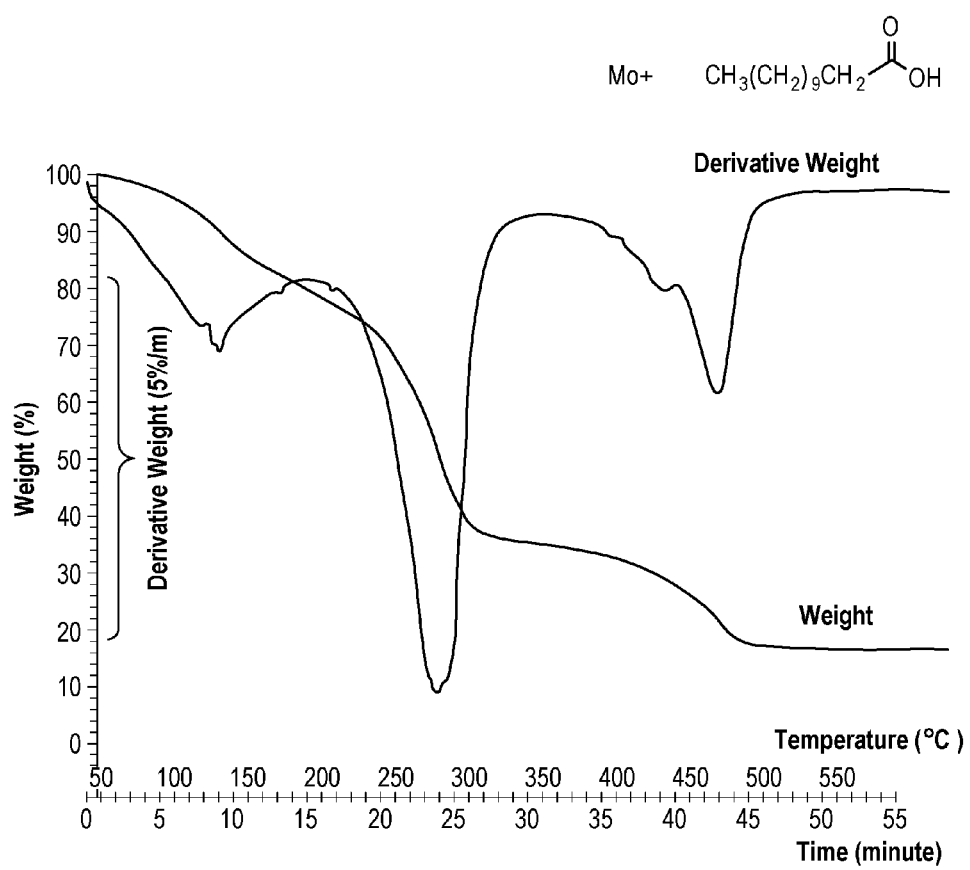
FIG. 5 shows the TGA plot for molybdenum dodecanoate.

As shown in FIG. 5, the weight curve shows the weight percentage of the remaining molybdenum dodecanoate as a function of time and temperature, and the derivative weight curve shows the corresponding rate of weight loss. The first trough of the TGA derivative weight curve corresponds to the first peak of decomposition temperature of molybdenum dodecanoate, at which the composition decomposes at a maximum rate. Decomposition starts near 225° C., and peaks near 270° C., significantly higher than prior art molybdenum 2-ethylhexanoate.

tion was heated to 165° C. overnight. The temperature was further brought up to 180° C. After the distillation, an oily, purple intermediate product was collected in the round bottom flask. The intermediate product was filtered using a 0.45 µm filter, which yielded a clear, colorless, oil-soluble catalyst precursor.

Approximately 0.1 g of the resulting molybdenum 5-phenylvalerate was dispersed in 5 ml of toluene, to yield a clear brown solution, which confirmed its solubility in heavy oil.

The starting and peak decomposition temperatures of molybdenum 5-phenylvalerate would be expected to be similar to those discussed in Example 1 above for molybdenum 4-heptylbenzoate.

COMPARATIVE EXAMPLES 9-12

Using methods similar to those in the previous examples, molybdenum salts were produced from various other carboxylic acids, including homophthalic acid, 2,3-pyridinedicarboxylic acid, decanoic acid, and myristic acid, according to Comparative Examples 9-12, respectively. When blended

TABLE 1

| Molybdenum Catalyst* | Example 1 | Example 2 | Example 3 | Example 4 | Example 5 | Example 6 | 2-ethyl hexanoate |
|---|---|---|---|---|---|---|---|
| Oil in (g) | 425.28 | 425.73 | 425.85 | 424.94 | 424.64 | 425.42 | 425.08 |
| THF washings out (g) | 12.56 | 12.02 | 13.54 | 12.81 | 13.33 | 12.91 | 11.2 |
| Free pour out (g) | 403.08 | 407.87 | 407.08 | 408.3 | 405.87 | 410.39 | 407.89 |
| total oil out (g) | 415.64 | 419.89 | 421.11 | 419.2 | 419.2 | 423.3 | 419.09 |
| Recovery % | 97.73 | 98.63 | 98.99 | 99.08 | 98.64 | 99.6 | 98.61 |
| H Activity | 285.8 | 290.2 | 293.3 | 290.3 | 297.2 | 294.5 | 286.5 |
| API Gravity | 13.1 | 12.3 | 13.3 | 13.22 | 12.9 | 13.14 | 13.2 |
| S (wt %) | 4.16 | 4.27 | 3.91 | 3.94 | 4.06 | 3.91 | 4.19 |
| Carbon (wt %) | 83.72 | 84.11 | 82.22 | 81.8 | 84.46 | 82.81 | 83.86 |
| Hydrogen (wt %) | 10.84 | 10.79 | 10.67 | 10.59 | 10.99 | 10.7 | 10.89 |
| Nitrogen (wt %) | 0.52 | 0.55 | 0.64 | 0.75 | 0.37 | 0.58 | 0.49 |
| IBP-650° F. (%) | 22.66 | 27.04 | 22.5 | 22.14 | 22.45 | 22.53 | 22.6 |
| IBP-650° F.+ (%) | 75.99 | 72.06 | 76.01 | 75.95 | 76.01 | 75.27 | 76.09 |
| Loss (%) | 1.35 | 0.9 | 1.49 | 1.91 | 1.54 | 2.18 | 1.31 |

*Molybdenum carboxylate catalysts for examples 1-5 are: (1) 4-heptyl-benzoate, (2) cyclohexane-butanoate, (3) 3-cyclopentyl-propanoate, (4) biphenyl-2-carboxylate, (5) 10-undecenoate, and (6) dodecaonate.

EXAMPLE 7

Example 7 describes a method for making a molybdenum catalyst precursor. In a 100 ml round bottom flask, a mixture of ammonium molybdate (2.00 g) geranic acid (3,7-dimethyl-2,6-octadienoic acid) (7.9 ml/7.66 g) was dissolved into 30 ml acetic anhydride. The solution was heated to 165° C. overnight. The temperature was further brought up to 180° C. After the distillation, an oily, purple intermediate product was collected in the round bottom flask. The intermediate product was filtered using a 0.45 µm filter, which yielded a clear, colorless, oil-soluble catalyst precursor.

Approximately 0.1 g of the resulting molybdenum geranate was dispersed in 5 ml of toluene, to yield a clear brown solution, which confirmed its solubility in heavy oil.

The starting and peak decomposition temperatures of molybdenum geranate would be expected to be similar to those discussed in Example 5 above for molybdenum 10-undecenoate.

EXAMPLE 8

Example 8 describes a method for making a molybdenum catalyst precursor. In a 100 ml round bottom flask, a mixture of ammonium molybdate (2.00 g) and 5-phenylvaleric acid (7.27 g) was dissolved into 30 ml acetic anhydride. The soluwith oil, these molybdenum salts produced black solid particles and were therefore not soluble in oil. Based on their structural similarity to molybdenum salts that were found to be soluble in oil, one would have expected these compounds to be readily oil soluble, which demonstrates the unpredictable nature and chemical aspects of molybdenum salts of similar structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A molybdenum catalyst precursor composition comprising:
    a molybdenum catalyst precursor composed of:
        a plurality of molybdenum atoms; and
        a plurality of carboxylate anions coordinated with each molybdenum atom and selected from the group consisting of: (a) aromatic carboxylate anions with one or two unfused aromatic rings and a total of 11 to 15 carbon atoms, (b) alicyclic carboxylate anions with a single aliphatic ring, an aliphatic side chain, and a total of 8 to 17 carbon atoms, (c) saturated aliphatic carboxylate anions with 11 to 15 carbon atoms, (d) unsaturated aliphatic carboxylate anions with 8 to 17 carbon atoms, and mixtures thereof;

with the proviso that the plurality of molybdenum atoms in the molybdenum catalyst precursor have an average oxidation state in a range of 4+ to 6+ and the molybdenum catalyst precursor is soluble in heavy oil, has a first decomposition temperature of at least 210° C. and has a peak decomposition temperature of at least 250° C.

2. A molybdenum catalyst precursor composition as in claim 1, wherein the plurality of carboxylate anions are provided by at least one carboxylic acid selected from the group consisting of 3-cyclopentylpropionic acid, cyclohexanebutyric acid, biphenyl-2-carboxylic acid, 4-heptylbenzoic acid, 5-phenylvaleric acid, and geranic acid.

3. A molybdenum catalyst precursor composition as in claim 1, wherein the plurality of carboxylate anions are provided by 10-undecenoic acid.

4. A molybdenum catalyst precursor composition as in claim 1, wherein the molybdenum catalyst precursor has a hydrocarbon solvent solubility of at least 1 mol % at 100° C. and 1 atm.

5. A molybdenum catalyst precursor composition as in claim 1, wherein the molybdenum catalyst precursor has a hydrocarbon solvent solubility of at least 5 mol % at 100° C. and 1 atm.

6. A molybdenum catalyst precursor composition as in claim 1, further comprising a hydrocarbon solvent into which the molybdenum catalyst precursor is dissolved, wherein the hydrocarbon solvent is selected from the group consisting of heavy oil, heavy crude oil, vacuum gas oil, decant oil, light gas oil, cycle oil, and combinations thereof.

7. A molybdenum catalyst precursor composition as in claim 1, further comprising one or more additional transition metal cations other than molybdenum bonded to a portion of the carboxylate anions.

8. A molybdenum catalyst precursor composition as in claim 1, the carboxylate anions comprising alicyclic carboxylate anions with a single aliphatic ring, an aliphatic side chain, and a total of 8 to 17 carbon atoms.

9. A molybdenum catalyst precursor composition as in claim 1, the carboxylate anions comprising aromatic carboxylate anions with one or two unfused aromatic rings and a total of 11 to 15 carbon atoms.

10. A molybdenum catalyst precursor composition as in claim 1, the carboxylate anions having at least one functional group that provides steric hindrance for the molybdenum atoms.

11. A molybdenum catalyst precursor composition as in claim 1, wherein the molybdenum catalyst precursor has a first decomposition temperature of at least about 230° C. and a peak decomposition temperature of at least about 270° C.

12. A molybdenum catalyst precursor composition as in claim 1, wherein the molybdenum catalyst precursor has a first decomposition temperature of at least about 250° C. and a peak decomposition temperature of at least about 290° C.

13. A molybdenum catalyst precursor composition as in claim 1, wherein the plurality of carboxylate anions are provided by dodecanoic acid.

14. A molybdenum catalyst precursor composition as in claim 1, the carboxylate anions comprising unsaturated aliphatic carboxylate anions with 8 to 17 carbon atoms.

15. A molybdenum catalyst precursor composition comprising:
a molybdenum catalyst precursor composed of:
a plurality of molybdenum atoms; and
a plurality of carboxylate anions coordinated with each molybdenum atom, wherein the carboxylate anions are provided by at least one carboxylic acid selected from the group consisting of 3-cyclopentylpropionic acid, cyclohexanebutyric acid, biphenyl-2-carboxylic acid, 4-heptylbenzoic acid, 5-phenylvaleric acid, geranic acid, 10-undecenoic acid, dodecanoic acid, and combinations thereof,
with the proviso that the plurality of molybdenum atoms in the molybdenum catalyst precursor have an average oxidation state in a range of 4+ to 6+ and the molybdenum catalyst precursor is soluble in heavy oil, has a first decomposition temperature of at least 210° C. and has a peak decomposition temperature of at least 250° C.

16. A method of hydroprocessing a heavy oil feedstock, comprising:
providing a heavy oil feedstock comprised of a substantial quantity of hydrocarbons having a boiling point greater than about 343° C.;
blending a molybdenum catalyst precursor as in claim 15 within the heavy oil feedstock at a temperature below which a significant portion of the catalyst precursor composition starts to decompose to form a conditioned feedstock;
heating the conditioned feedstock to a temperature above a decomposition temperature of the molybdenum catalyst precursor in order to decompose the molybdenum catalyst precursor and form an in situ colloidally-dispersed catalyst within the heavy oil feedstock;
reacting the heavy oil feedstock and in situ colloidally-dispersed catalyst with hydrogen under hydrocracking conditions within a hydrocracking reactor to yield an upgraded oil fraction.

17. A method as defined in claim 16, wherein the heavy oil feedstock comprises at least one of heavy crude oil, oil sand bitumen, atmospheric tower bottoms, vacuum tower bottoms, resid, visbreaker bottoms, coal tar, heavy oil from oil shale, or liquefied coal.

18. A method as defined in claim 16, further comprising mixing the catalyst precursor with a hydrocarbon oil diluent to form a diluted catalyst precursor mixture before mixing the catalyst precursor with the heavy oil feedstock.

19. A method as defined in claim 18, wherein the hydrocarbon oil diluent comprises at least one of vacuum gas oil, decant oil, light gas oil, or cycle oil.

20. A method as defined in claim 18, wherein the catalyst precursor is mixed with the hydrocarbon oil diluent for a period of time in a range of about 0.001 second to about 20 minutes.

21. A method as defined in claim 18, wherein the diluted catalyst precursor mixture is mixed with the heavy oil for a period of time in a range of about 0.001 second to about 20 minutes.

22. A method of making a molybdenum catalyst precursor composition for hydrocracking heavy oil, comprising:
providing a plurality of molybdenum atoms;
providing a plurality of carboxylate anions selected from the group consisting of: (a) aromatic carboxylate anions with one or two unfused aromatic rings and a total of 11 to 15 carbon atoms, (b) alicyclic carboxylate anions with a single aliphatic ring, an aliphatic side chain, and a total of 8 to 17 carbon atoms, (c) saturated aliphatic carboxylate anions with 11 to 15 carbon atoms, (d) unsaturated aliphatic carboxylate anions with 8 to 17 carbon atoms, and mixtures thereof; and reacting the plurality of molybdenum atoms with the plurality of carboxylate anions in the presence of a reducing agent to yield a molybdenum catalyst precursor comprised of a molybdenum salt, with the proviso that the molybdenum atoms within the molybdenum salt have an average oxidation state in a range of 4+ to 6+ and the molybdenum catalyst precursor is soluble in heavy oil, has a first decomposition temperature of at least 210° C. and has a peak decomposition temperature of at least 250° C.

23. A method of making a molybdenum catalyst precursor composition for hydrocracking heavy oil, comprising:

providing a plurality of molybdenum atoms;

providing a plurality of carboxylate anions provided by at least one carboxylic acid selected from the group consisting of 3-cyclopentylpropionic acid, cyclohexanebutyric acid, biphenyl-2-carboxylic acid, 4-heptylbenzoic acid, 5-phenylvaleric acid, geranic acid, 10-undecenoic acid, dodecanoic acid, and combinations thereof; and reacting the plurality of molybdenum atoms with the plurality of carboxylate anions in the presence of a reducing agent to yield a molybdenum catalyst precursor comprised of a molybdenum salt, with the proviso that the molybdenum atoms within the molybdenum salt have an average oxidation state in a range of 4+ to 6+ and the molybdenum catalyst precursor is soluble in heavy oil, has a first decomposition temperature of at least 210° C. and has a peak decomposition temperature of at least 250° C.

* * * * *